United States Patent [19]

Eastman et al.

[11] Patent Number: 5,267,914
[45] Date of Patent: Dec. 7, 1993

[54] POWER TRANSMISSION DEVICE FOR A FOUR WHEEL DRIVE VEHICLE

[75] Inventors: Richard E. Eastman, Central Square; Richard A. Bakowski, Warners, both of N.Y.

[73] Assignee: New Venture Gear, Inc., Troy, Mich.

[21] Appl. No.: 42,469

[22] Filed: Apr. 5, 1993

Related U.S. Application Data

[63] Continuation of Ser. No. 867,967, Apr. 13, 1992, abandoned.

[51] Int. Cl.$^5$ .................................... F16H 37/08
[52] U.S. Cl. ..................... 475/221; 74/665 T; 180/248
[58] Field of Search ............ 475/198, 220, 221, 222, 475/248; 180/248; 74/665 T

[56] References Cited

U.S. PATENT DOCUMENTS

| | | | |
|---|---|---|---|
| 4,577,721 | 3/1986 | Ashikawa | 180/248 |
| 4,589,304 | 5/1986 | Ashikawa et al. | 475/221 X |
| 4,604,908 | 8/1986 | Dolan | 74/15.88 |
| 4,635,504 | 1/1987 | Cordero et al. | 475/221 |
| 4,700,800 | 10/1987 | Friedrich et al. | 180/248 X |
| 4,718,301 | 1/1988 | Friedrich | 475/222 X |
| 4,729,259 | 3/1988 | Lanzer | 180/248 X |
| 4,739,678 | 4/1988 | Miura et al. | 74/665 T |
| 4,784,236 | 11/1988 | Bausch et al. | 475/221 X |
| 4,974,696 | 12/1990 | Miyajima et al. | 180/248 |
| 5,109,944 | 5/1992 | Torii | 180/248 |
| 5,146,801 | 9/1992 | Oda | 475/221 X |

FOREIGN PATENT DOCUMENTS

| | | | |
|---|---|---|---|
| 97434 | 4/1988 | Japan | 180/248 |
| 103543 | 4/1989 | Japan | 180/248 |

*Primary Examiner*—Leslie A. Braun
*Assistant Examiner*—Khoi Q. Ta
*Attorney, Agent, or Firm*—Harness, Dickey & Pierce

[57] ABSTRACT

A power transmission device for converting a four wheel drive vehicle is disclosed. The device utilizes the existing highway gear ratios available on standard front wheel drive vehicles. By incorporating an additional gear ratio for both the front and rear wheels, the lower gear ratios desired by off-road users are provided.

13 Claims, 6 Drawing Sheets

POWER TRANSMISSION DEVICE FOR A FOUR WHEEL DRIVE VEHICLE

This is a continuation of U.S. patent application Ser. No. 07/867,967, filed Apr. 13, 1992 now abandoned.

BACKGROUND OF THE INVENTION

The present invention relates to a power transmission device for a motor vehicle and, more particularly, to a power transmission device for a four-wheel drive vehicle.

A majority of the passenger vehicles manufactured today are front wheel drive vehicles. These vehicles use a transaxle assembly to distribute the power from the engine to the front drive wheels. The transaxle assembly is a combination of a transmission and a front differential packaged together as a single unit. This transaxle assembly is connected directly to the engine.

Due to the increasing popularity of four-wheel drive vehicles, the need was created for a power transmission device which would convert a front wheel drive vehicle into a four-wheel drive vehicle. Various devices are now available which incorporate a power take-off unit into a transaxle assembly for providing power to the rear wheels of a front wheel drive vehicle, thus making the vehicle four-wheel drive.

While these devices have enjoyed various amounts of success, they all have the common problem of limited availability of lower gear ratios. A large majority of the transaxles in volume production are designed for passenger car or on-road usage. The transmission ratios and final drive ratios available in these transaxles were developed for highway driving. The transaxle cases manufactured for front wheel drive vehicles do not provide sufficient room to accommodate the larger diameter gears which are needed to produce the lower gear ratios desired by the sport and light truck market. The sport and light truck owners take their vehicles "off road". They, therefore, desire a lower gear ratio to enable them to maneuver their vehicles through typical off road conditions. The tooling costs associated with providing a unique transaxle for a four-wheel drive version of a vehicle is prohibitive.

Accordingly, what is needed is a power transmission device for four-wheel drive vehicles which utilizes the gear ratios available in current production front wheel drive vehicles but still provides the lower gear ratios desired for the off-road drivers.

SUMMARY OF THE INVENTION

The present invention provides the art with a power transmission device which utilizes the gear ratios of existing transaxle assemblies and provides an additional gear reduction for achieving the lower drive ratios desired for "off road" use. The power transmission device uses a planetary gear set between the final drive gear and the front differential and a ring and pinion assembly between the final drive gear and the rear differential for providing an additional gear reduction. The transmission device is designed to be compatible with existing transaxle components while being compact in design to provide easy packaging.

DESCRIPTION OF THE DRAWINGS

Further objects, features and advantages of the present invention will become apparent from the analysis of the following written specification, the accompanying drawings and the appended claims in which:

DETAILED DESCRIPTION OF THE INVENTION

Figure 1:
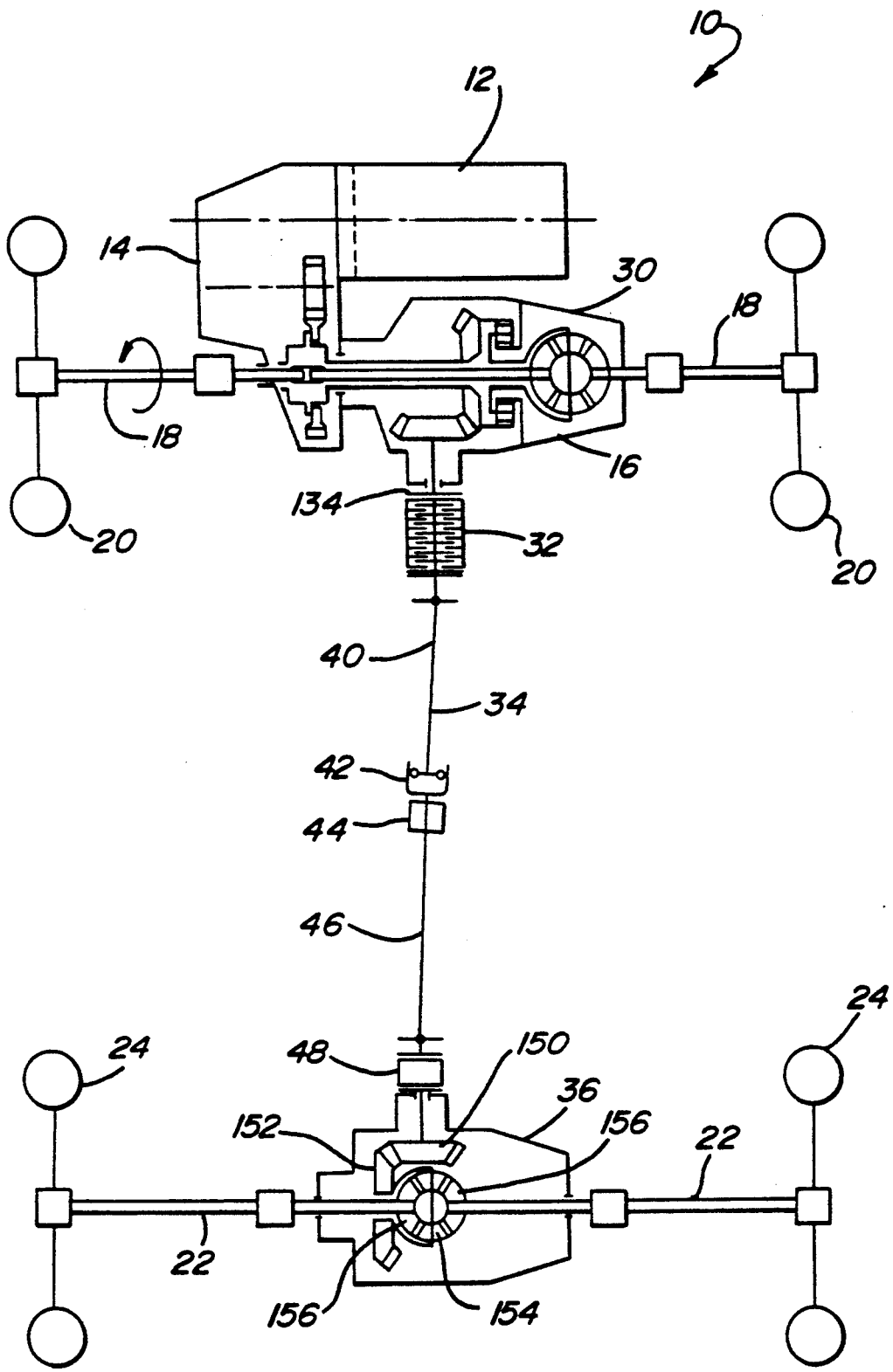
FIG. 1 is a schematic representation of the power transmission device of the present invention.

FIG. 1 shows a schematic representation of the power transmission device of the present invention in conjunction with the drive train of a four wheel drive vehicle and is designated by the reference numeral 10. The drive train system consists of engine 12, transaxle 14, the power transmission device 16, front half-shafts 18, front wheels 20, rear half-shafts 22 and rear wheels 24. The power transmission device 16 consists of the front power transfer drive unit 30, viscous transmission 32, prop shaft 34 and rear axle differential 36. The prop shaft assembly 34 consists of front propeller shaft 40, plunging joint 42, center bearing 44, rear prop shaft 46 and disconnect device 48.

Figure 2:
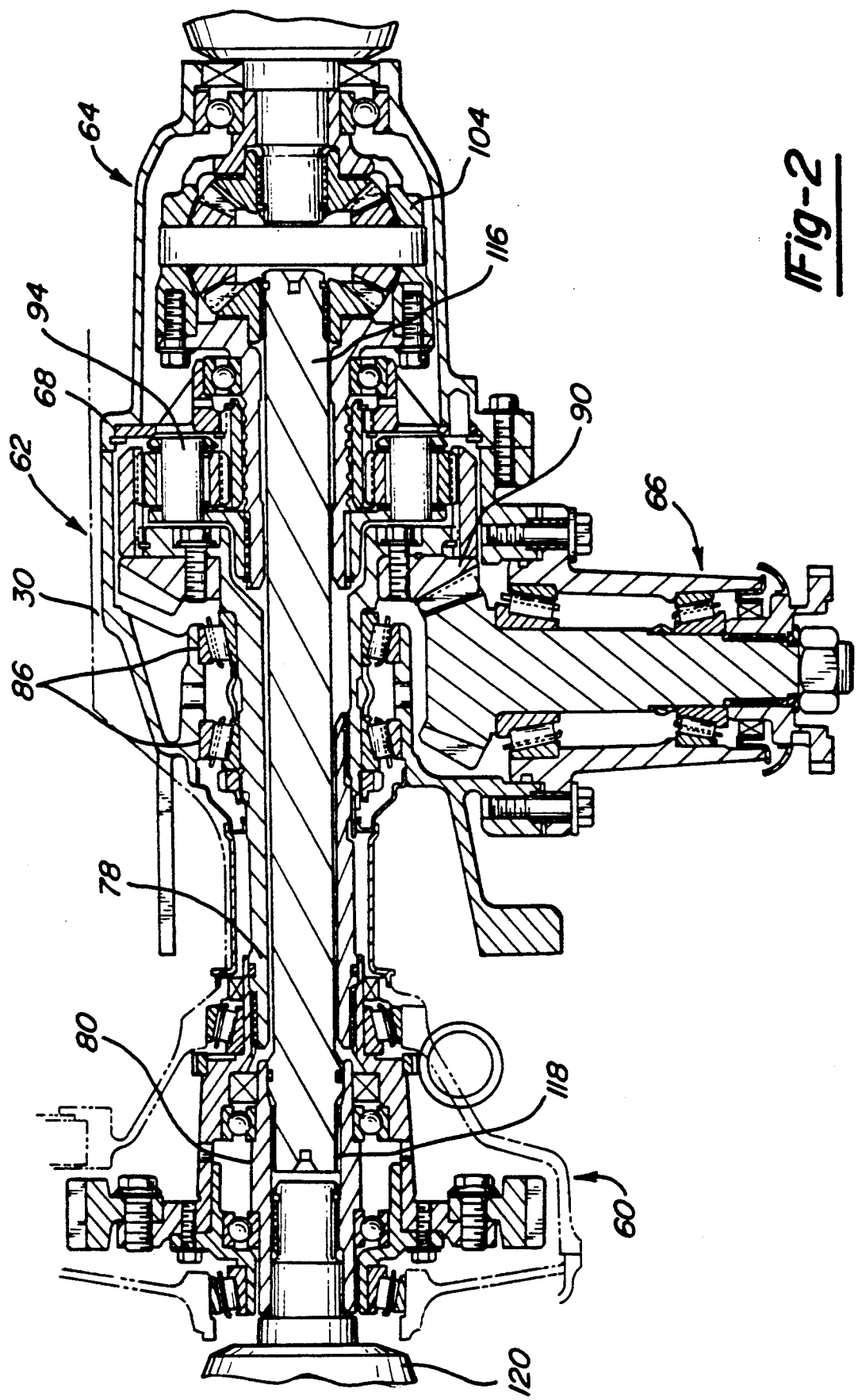
FIG. 2 is cross-sectional view of the front power transfer drive unit.

Referring now to FIG. 2, the front power transfer drive unit consists of transaxle drive section 60, power take-off section 62, front drive section 64 and rear drive section 66.

Figure 3:
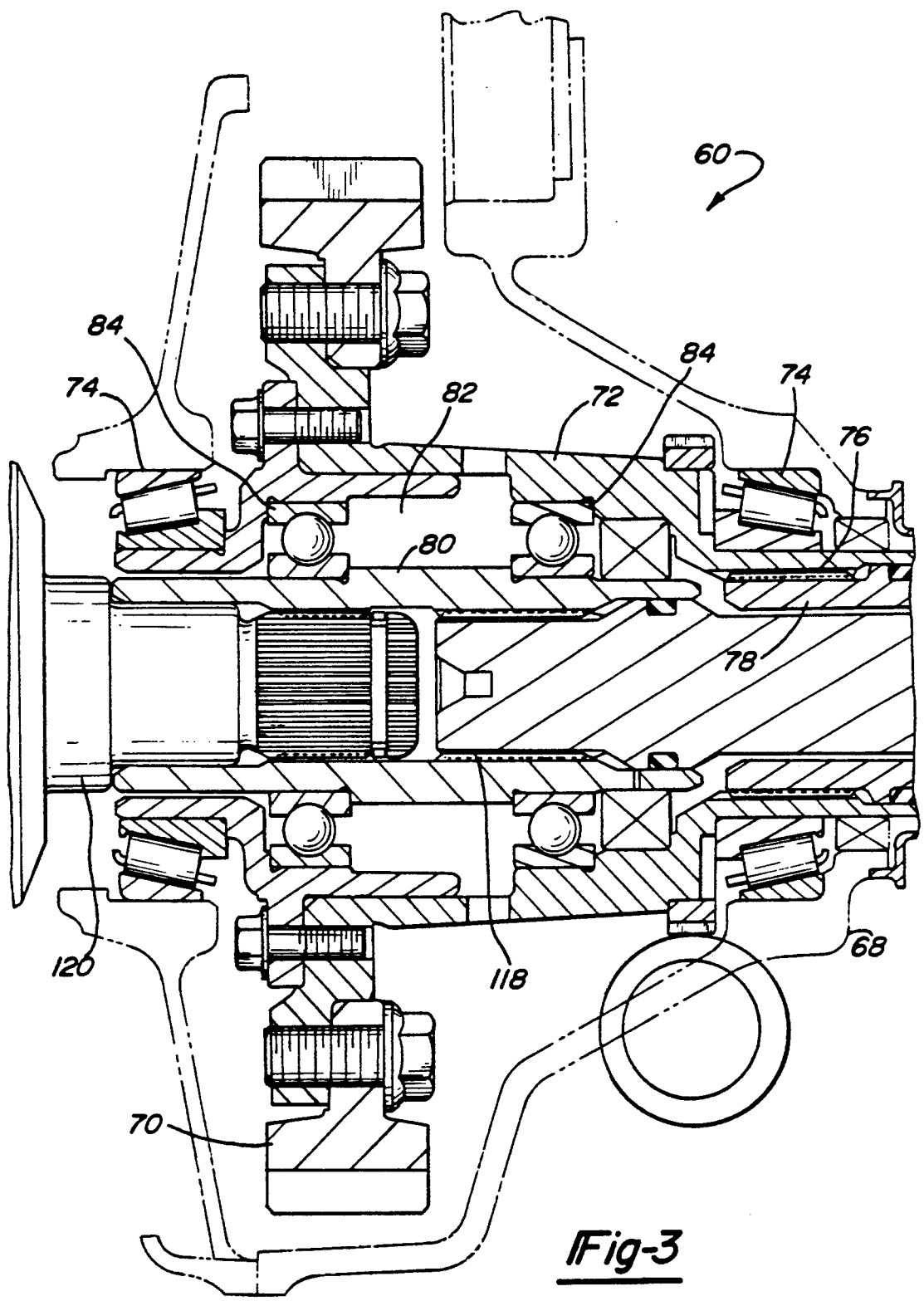
FIG. 3 is a cross-sectional view of the transaxle drive section of the front power transfer drive unit.

Referring now to FIGS. 2 and 3, the transaxle drive section consists of final drive gear 70 which is attached to the final drive gear carrier assembly 72. The final drive gear carrier assembly is supported in the housing 68 by a pair of ball or tapered roller bearings 74. The final drive gear carrier assembly is attached by spline means 76 to quill shaft 78. Bridge 80 is positioned in the internal cavity 82 of final drive gear carrier assembly 72 by a pair of roller bearings 84. The power is transmitted from the transaxle to the final drive gear 70 which transmits the power to the final drive gear carrier assembly 72 which transmits the power to the quill shaft 78. The quill shaft 78 is supported in the housing 68 by a pair of tapered roller bearings 86. The quill shaft 78 transmits the power from the transaxle drive section 60 to the power take-off section 62.

Figure 4:
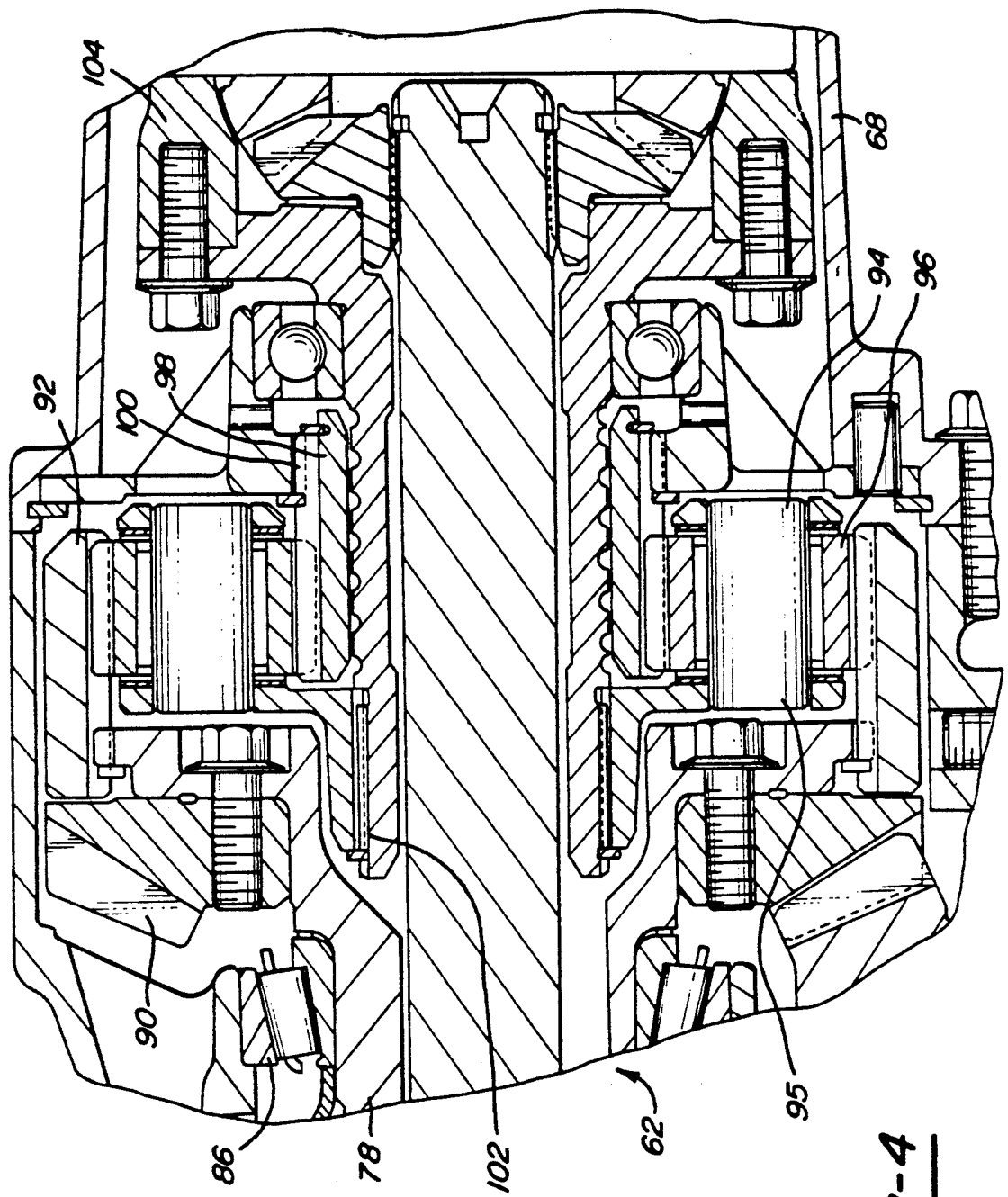
FIG. 4 is a cross-sectional view of the power take-off section of the front power transfer drive unit.

Referring now to FIGS. 2 and 4, the quill shaft 78 is attached to a hypoid ring gear 90. The hypoid ring gear 90 transfers power from the quill shaft to the rear drive section 66. The quill shaft 78 is also attached to the annulus gear 92 of the planetary gear unit 94. The planetary gear unit 94 consists of annulus gear 92, carrier gear unit 95, planetary gears 96 and sun gear 98. The sun gear 98 is connected to the housing 68 by spline means 100. Thus, the sun gear 98 is held stationary. The carrier gear unit 95 is attached by spline means 102 to the front drive section of the differential carrier 104. The quill shaft 78 transmits power to the annulus gear 92 which transmits power to the differential carrier 104 through the planetary gears 96 via the carrier gear unit 95. This configuration will provide a gear reduction ratio which is equal to the number of teeth on the sun gear divided by the number of teeth on the annulus gear plus one. In the present invention, the sun gear 98 has 38 teeth, the annulus gear 92 has 82 teeth which gives a gear reduction ratio of 1.46.

Figure 5:
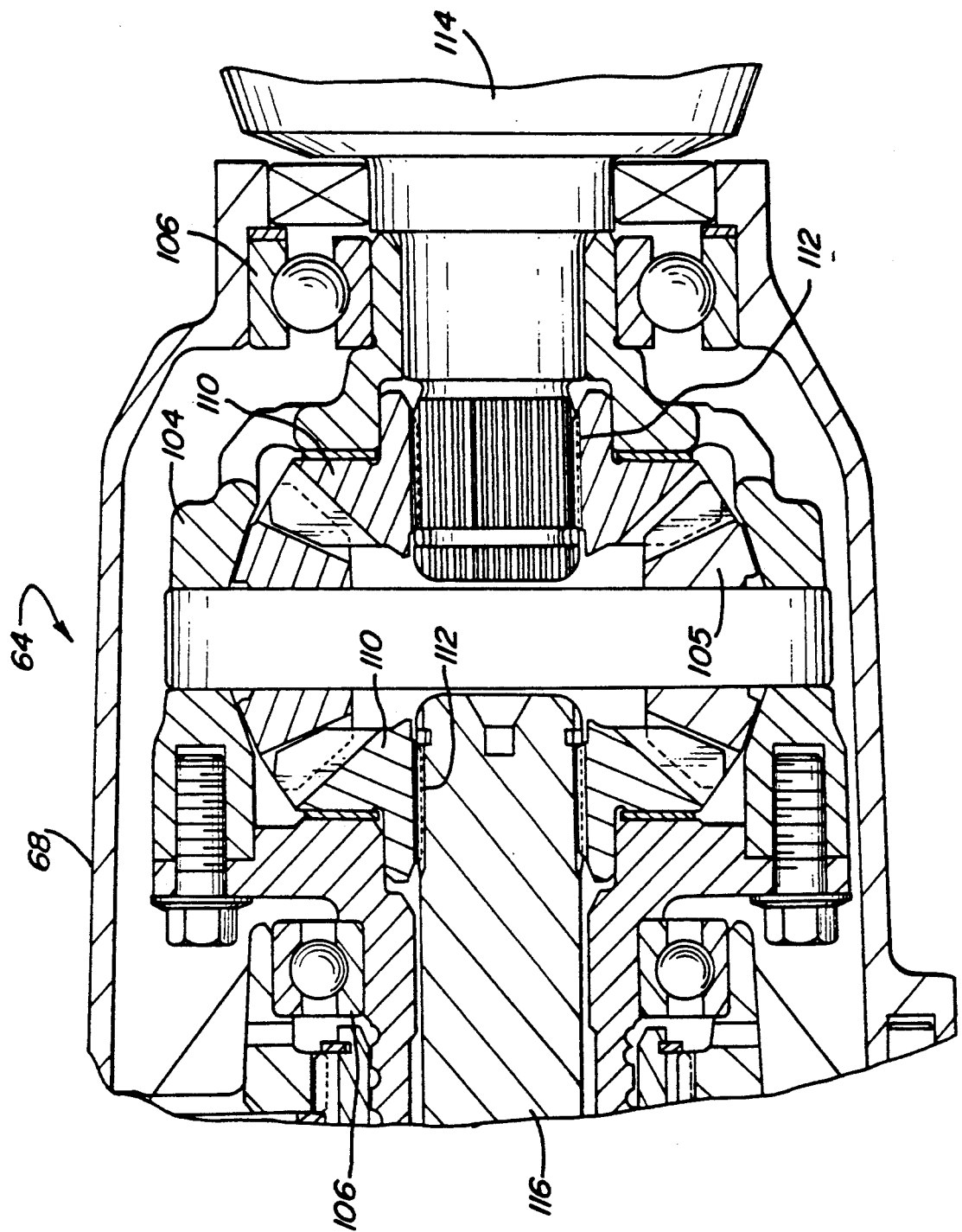
FIG. 5 is a cross-sectional view of the front drive section of the front power transfer drive unit.

Referring now to FIGS. 2 and 5, the front drive section consists of differential carrier 104 which is supported in the case 68 by a pair of ball bearings 106. The differential carrier 104 supports differential gears 105 which are meshed with side gears 110. One of the side gears 110 is splined by spline means 112 to the right hand CV joint 114. The other side gear 110 is connected by spline means 112 to cross-shaft 116. Cross-shaft 116 is connected by spline means 118 to bridge 80 in the transaxle drive section 60. The bridge 80 is also connected by spline means 118 to the left hand CV joint 120.

Figure 6:
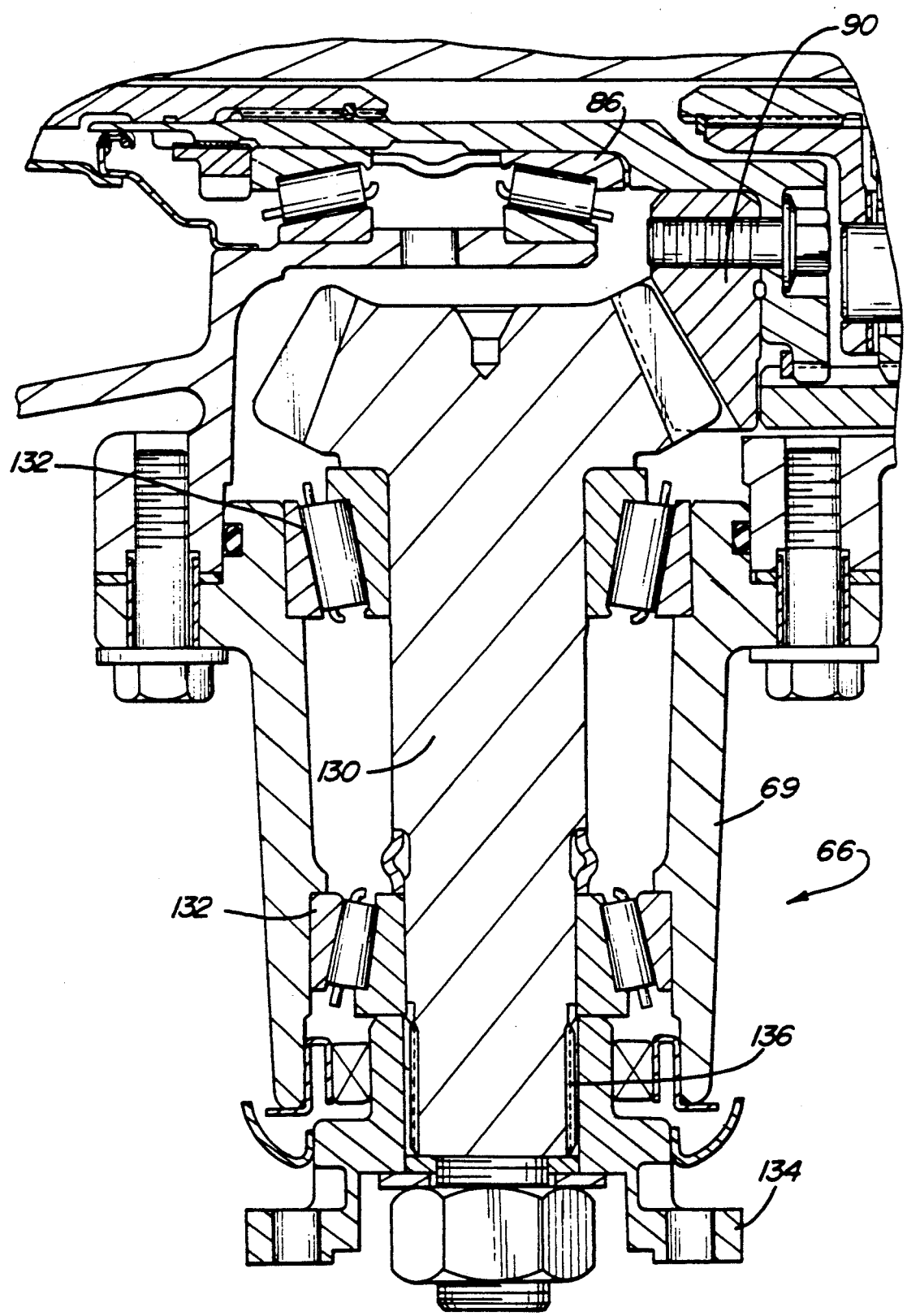
FIG. 6 is a cross-sectional view of the rear drive section of the front power transfer drive unit.

Referring now to FIGS. 2 and 6, the rear drive section 66 consists of hypoid ring gear 90 and pinion shaft 130. The pinion shaft 130 is meshed with hypoid ring gear 90 and is supported in housing 69 by a pair of tapered roller bearings 132. Pinion shaft 130 is attached to output flange 134 by spline means 136. The power is transmitted from the quill shaft 78 to the hypoid ring gear 90 to the pinion shaft 130. The gear reduction ratio is equal to the number of teeth on the pinion shaft 130 divided by the number of teeth on the hypoid ring gear 90. In the present invention, the pinion shaft 180 has 14 teeth and the hypoid ring gear 90 has 31 teeth. This provides an overdrive ratio of 0.4516.

Referring now to FIG. 1, the input to the viscous transmission 32 is attached to output flange 134. The output of the viscous transmission is connected to front prop shaft 40 which is connected by plunging joint 42 to center bearing 44. The rear prop shaft 46 transmits the power from the plunging joint 42 to the rear differential 36. Disconnect device 48 is provided for assembly of the prop shaft. The rear differential 36 consists of pinion shaft 150, hypoid ring gear 152, differential carrier 154 and side gears 156. The power is transmitted from the prop shaft assembly 34 to the pinion shaft 150, to the hypoid ring gear 152 and to the differential carrier 154. The differential carrier 154 transmits the power through the side gears 156 to the rear half-shafts 22. The rear differential ratio can be determined by dividing the number of teeth on the hypoid ring gear 152 by the number of teeth on the pinion shaft 150. In the present invention, the hypoid ring gear 152 has 45 teeth and the pinion shaft 150 has 14 teeth. This provides a gear reduction ration of 3.2143.

Upon operation of the vehicle, power is transmitted from the transaxle to the front wheels through the planetary gear unit 94. This provides for a first gear reduction ratio. In the present invention, this gear reduction ratio is 1.46. Power is also transmitted from the transaxle to the rear wheels. The gear reduction for the rear wheels is a combination of the hypoid ring gear and pinion ratio in the front power transfer unit and the hypoid ring gear and pinion gear ratio in the rear axle differential. For the present invention, the front power transfer drive unit has a overdriving ratio of 0.4516. The rear axle differential has a gear reduction of 3.2143. This provides an overall ratio of 1.45. The rear drive ratio is purposely lower than the front drive ratio to ensure that the rear drive will be slightly overdriving the front drive. The difference in speed is taken up by and is thereby slightly working the viscous transmission 32. When slip occurs at the front wheel, the speed of hypoid ring gear 90 will increase thus increasing the speed of the input to the viscous transmission 32. The viscous transmission 32 will then operate to drive the rear wheels 24. The difference in overall drive ratios between the front and rear wheels helps to eliminate any time lag prior to the viscous transmission 32 driving the rear wheels.

While the above detailed description describes the preferred embodiment of the present invention, it should be understood that the present invention is susceptible to modification, variation and alteration without deviating from the scope and fair meaning of the subjoined claims.

What is claimed is:

1. A power transmission device for a four wheel drive vehicle comprising;
    a first differential means interconnecting a first set of ground-engaging wheels;
    a second differential means interconnecting a second set of ground-engaging wheels;
    power transmission means operably interconnected between a source of power and said first and second differential means for receiving drive torque from said source of power and transferring said drive torque to said first and second differential means;
    a planetary gear assembly operably interconnected between said power transmission means and said first differential means, said planetary gear assembly providing a first gear reduction ratio, said planetary gear assembly comprising an annulus, a carrier gear unit, a plurality of planetary gears and a sun gear, said sun gear being non-rotatively fixed within said power transmission device;
    a first ring and pinion gear assembly operably interconnected between said power transmission means and said second differential means, said first ring and pinion gear assembly providing a second gear reduction ratio; and
    a second ring and pinion gear assembly operably interconnected between said first ring and pinion gear assembly and said second differential means, said second ring and pinion gear assembly providing a third gear reduction ratio, and wherein said first gear reduction ratio is slightly greater than the combination of said second and third gear reduction ratios such that said power transmission means overdrives said second set of ground-engaging wheels in relation to said first set of ground-engaging wheels.

2. The power transmission device of claim 1 further comprising limited slip means operably interconnected between said first and second ring and pinion gear assemblies, said limited slip means accommodating a limited amount of rotational speed difference between said first and second set of ground-engaging wheels.

3. The power transmission device of claim 2 wherein said limited slip means is a viscous transmission.

4. The power transmission device of claim 1 wherein said power transmission means comprises:
    a final drive gear operably connected to said source of power, said final drive gear being rotatable about a first drive axis; and
    a quill shaft disposed coaxial with said first drive axis, said quill shaft receiving power from said final drive gear and transmitting power to both said planetary gear assembly and said first ring and pinion gear assembly.

5. The power transmission device of claim 4 wherein said quill shaft is operably connected to said annulus gear of said planetary gear assembly.

6. The power transmission drive of claim 5 wherein a differential carrier of said first differential means is operably connected to said carrier gear unit of said planetary gear assembly.

7. The power transmission device of claim 4 wherein said quill shaft is operably connected to a hypoid ring gear of said first ring and pinion gear assembly.

8. A power transmission device for a four wheel drive vehicle comprising:
- a first differential means interconnecting a first set of ground-engaging wheels;
- a second differential means interconnecting a second set of ground-engaging wheels;
- power transmission means operably interconnected between a source of power and said first and second differential means for receiving drive torque from said source of power and transferring said drive torque to said first and second differential means;
- a planetary gear assembly operably interconnected between said power transmission means and said first differential means, said planetary gear assembly providing a first gear reduction ratio, said planetary gear assembly comprising an annulus, a carrier gear unit, a plurality of planetary gears and a sun gear, said sun gear being non-rotatively fixed within said power transmission device;
- a first ring and pinion gear assembly operably interconnected between said power transmission means and said second differential means, said first ring and pinion gear assembly providing a second gear reduction ratio;
- a second ring and pinion gear assembly operably interconnected between said first ring and pinion gear assembly and said second differential means, said second ring and pinion gear assembly providing a third gear reduction ratio, and wherein said first gear reduction ratio is slightly greater than the combination of said second and third gear reduction ratios such that said power transmission means overdrives said second set of ground-engaging wheels in relation to said first set of ground-engaging wheels; and
- limited slip means interconnected between said first and second ring and pinion gear assemblies for accommodating a limited amount of rotational speed difference between said first and second set of ground-engaging wheels.

9. The power transmission device of claim 8 wherein said limited slip means is a viscous transmission.

10. The power transmission device of claim 8 wherein said power transmission means comprises:
- a final drive gear operably connected to said source of power, said final drive gear being rotatable about a first drive axis; and
- a quill shaft disposed coaxial with said first drive axis, said quill shaft receiving power from said final drive gear and transmitting power to both said planetary gear assembly and said first ring and pinion gear assembly.

11. The power transmission device of claim 10 wherein said quill shaft is operably connected to said annulus gear of said planetary gear assembly.

12. The power transmission drive of claim 11 wherein a differential carrier of said first differential means is operably connected to said carrier gear unit of said planetary gear assembly.

13. The power transmission device of claim 10 wherein said quill shaft is operably connected to a hypoid ring gear of said first ring and pinion gear assembly.

* * * * *